Feb. 14, 1967 G. F. HAMANN, SR 3,303,570
PRECISION MEASURING RULER
Filed July 21, 1965

INVENTOR

GEORGE F. HAMANN, SR.

BY

ATTORNEYS

United States Patent Office 3,303,570
Patented Feb. 14, 1967

3,303,570
PRECISION MEASURING RULER
George F. Hamann, Sr., 807 Thomson St.,
Flint, Mich. 48503
Filed July 21, 1965, Ser. No. 473,630
1 Claim. (Cl. 33—107)

This invention relates to a precision measuring ruler and more particularly to a ruler useful to draftsmen and the like for making precise measurements.

Draftsmen are frequently called upon to make precise drawings wherein errors of even a few thousandths of an inch may result in an unsatisfactory drawing. Measuring devices presently available are either imprecise due to the construction of the measuring device or due to the latitude given to the draftsmen in locating a mark relative to the measuring device, or are too expensive.

Thus, it is an object of this invention to provide a precision measuring ruler which is inexpensive in construction and so easy to operate that even an unskilled draftsman will be enabled to speedily and precisely locate marks from such ruler by using his already available sharpened pencil or pointed marker.

A further object of this invention is to provide a measuring ruler having a precision measuring edge formed of a large number of parallel wires arranged side by side so that a draftsman may locate and mark various points merely by sliding his sharpened pencil or sharpened measuring device between two adjacent wires to thus quickly and accurately make marks as desired.

These and other objects and advantages of this invention will become apparent upon reading the following description of which the attached drawings form a part.

Figure 1:
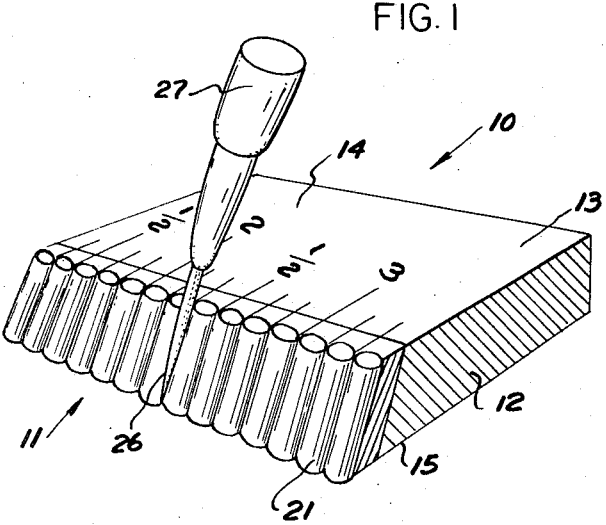
FIG. 1 is a perspective view of a fragment of the precision measuring ruler hereof.
Figure 2:
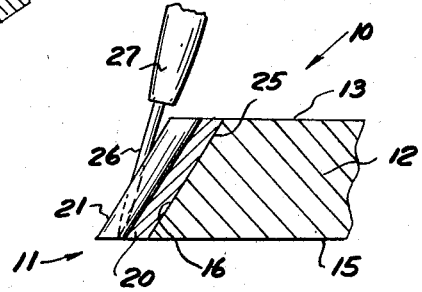
FIG. 2 is a cross-sectional, end view of a fragment of the measuring ruler, showing the measuring edge.

As shown in FIGS. 1 and 2, the measuring ruler 10 is formed with a precision measuring edge 11 mounted upon a base strip 12 which may be formed of wood, plastic or metal, and which has an upper, indicia bearing surface 13 upon which indicia 14 is imprinted in any conventional manner. The base strip is formed with a lower, work-contacting, surface 15 and has a sloped forward edge 16.

Secured to the sloped edge 16 is a thin metal edge strip 20 upon which a plurality of fine, uniformly dimensioned wires 21 are mounted with the wires being arranged parallel to each other and sloped at an acute angle relative to the lower surface 15. The wires may be in line contact with each other or may be separated from each other very slightly, but preferable they are in line contact.

The metal edge strips 20 with their wires 21, are formed by starting with a large, thin metal sheet 22 upon which are placed a large number of wires 21. The wires are secured to the sheet by means of welding or the like as shown at 23 in FIG. 4. The wires may be simply placed on the sheet and aligned with each other in parallelism as shown in FIG. 3 or they may be automatically and continuously applied to the sheet by means of suitable rollers having grooves formed in their peripheries for locating and positioning the wires upon the sheet 22.

Figure 3:
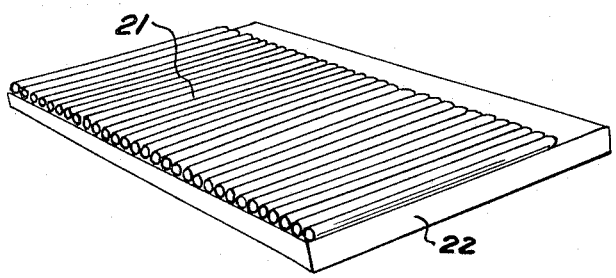
FIG. 3 is a perspective, fragmentary view of a portion of the metal sheet and wires used in making the measuring edge prior to their being cut to size to form the measuring edge of the ruler.
Figure 4:
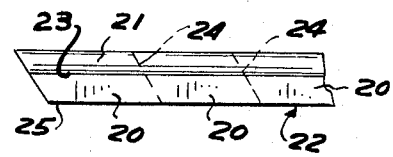
FIG. 4 is an enlarged end view of a portion of the sheet of FIG. 3.

Once the sheet 22 and the wires 21 are secured together as shown in FIG. 3 the sheet is then sliced into sections along an angle or biased cut line as shown by dotted lines 24 in FIG. 4.

Figure 5:
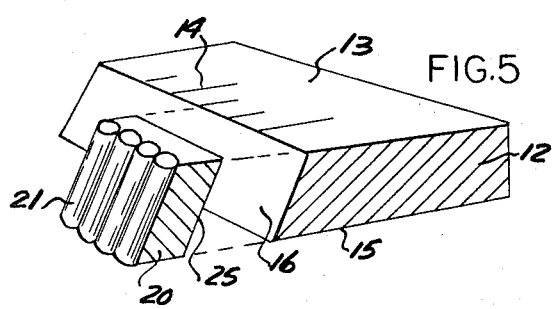
FIG. 5 is a perspective, fragmentary view, of the parts of the ruler shown disassembled.

As shown in FIG. 5 the severed metal strips 20 with their attached wires 21 are then aligned with the sloped edge 16 of the base strip and the rear face 25 of the strip 20 is secured to the edge 16 by means of a suitable adhesive. After the strip 20 is adhesively secured to the edge 16, the upper and lower ends of the wire form continuations of the surfaces of the base strip, that is, they lie in the same planes as the planes of the upper and lower surfaces of the base strip.

In operation, referring to FIGS. 1 and 2, the draftsman places the ruler upon a sheet of paper or other flat workpiece and marks the desired dimensions thereon by means of a marking device 27 having a sharpened point 26. The marking device may be in the form of a conventional drafting pencil, with ordinary lead, or may be in the form of a pointed object such as one leg of a pair of dividers or a stylus or the like. The sharpened point 26 is simply slid down between two adjacent wires until the point contacts the workpiece or paper and makes a mark thereon. The ruler is provided with suitable indicia aligned between adjacent pairs of wires so that by means of sliding the point between the wires, the draftsman will precisely locate the mark relative to the indicia. Depending upon the accuracy of the initial location of the wires, drafting errors can be reduced to zero.

As can be seen, because the marking operation consists of merely sliding the end of the pointed pencil between two wires, marking and locating points can be accomplished rapidly with practically no effort on the part of the draftsman.

This invention may be further developed within the scope of the following claim.

Accordingly, it is desired that the foregoing description be read as being merely illustrative of an operative embodiment of this invention and not in a strictly limited sense.

Having fully described an operative embodiment of the invention, I now claim:

An elongated precision measuring strip having an elongated edge and upper and lower faces;
  said elongated edge being covered with a row of axially parallel, round, identical, fine wires of circular cross-section; arranged in diametrical line to line direct and intimate contact, with no spaces between them, arranged on and secured to said edge transversely of the strip and perpendicular to said faces.

References Cited by the Examiner

UNITED STATES PATENTS

| | | | |
|---|---|---|---|
| 345,989 | 7/1886 | Podgorski | 33—110 |
| 368,928 | 8/1887 | Buck | 33—80 |
| 419,640 | 1/1890 | Class | 33—81 |
| 1,092,107 | 3/1914 | Jacobsen | 33—81 X |
| 2,554,099 | 6/1951 | Ermold | 33—107 |

LEONARD FORMAN, *Primary Examiner.*

H. N. HAROIAN, *Assistant Examiner.*